Sept. 2, 1958 E. JOUMIER 2,850,597
AUTOMATIC CONTROLLER FOR HIGH TEMPERATURE
ELECTRIC FURNACES
Filed June 7, 1957
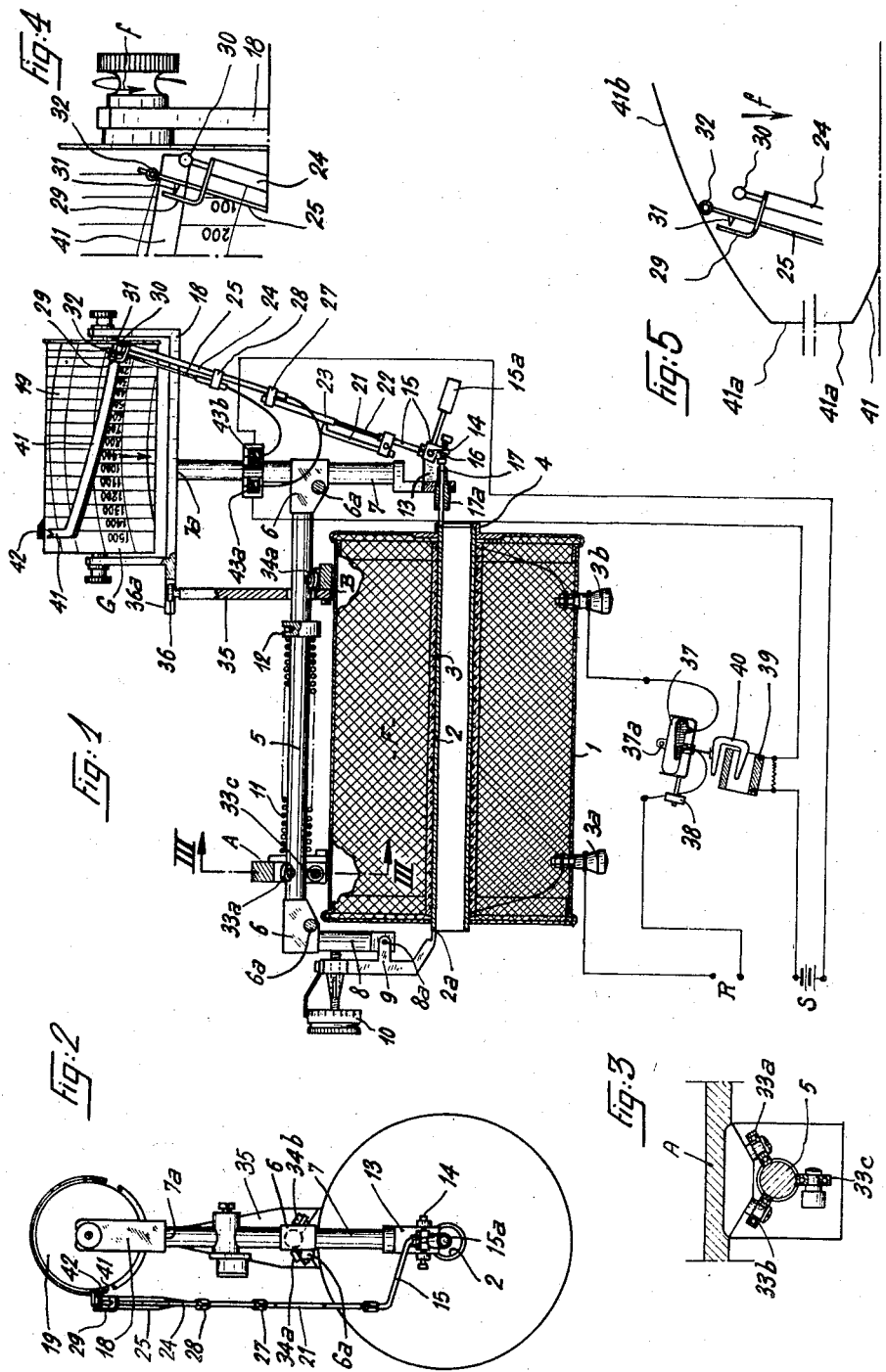

United States Patent Office 2,850,597
Patented Sept. 2, 1958

2,850,597

AUTOMATIC CONTROLLER FOR HIGH TEMPERATURE ELECTRIC FURNACES

Eugène Joumier, Paris, France, assignor to A. D. A. M. E. L. Ateliers d'Appareils de Mesure et de Laboratoire (Societe Anonyme), Paris, France, a company of France Application June 7, 1957, Serial No. 664,394

Claims priority, application France June 12, 1956

10 Claims. (Cl. 200—137)

This invention relates to automatic controller for high temperature electric furnaces and more particularly to automatic temperature control devices for electric furnaces.

It is known to provide electric furnaces with automatic controllers consisting of a measuring device for simultaneously sensing the actual temperature of the heating chamber and giving the theoretical process temperature at any particular time and of a controlling device for regulating or controlling the application of current to the heating chamber based upon differential between sensed and theoretical temperatures. The actual temperature measuring device in such controllers may be the pyrometer in the circuit of a potentiometer instrument or an expansion type thermometer the expansion of which is transmitted by an amplifying mechanism to a needle which indicates the actual temperature in the furnace on a scale. The measuring device for the theoretical or predetermined process temperature in such controllers is a clock mechanism driven drum provided with a template surface corresponding with the temperature time curve of the particular process to be carried out in the heating chamber so that for any given time the surface of the drum at the template indicates the theoretical or predetermined process temperature. Either the potentiometer instrument or the pointer is connected to the surface of the drum so that the differential between actual and theoretical or predetermined temperature at any particular time is always indicated on the drum. The controlling device in known apparatus includes an electrical circuit having a pair of contacts which may be open or shut to correspondingly control the current to the heating chamber in accordance with the space between the two contacts which corresponds to the differential between the combined actual and theoretical or predetermined measurements from the temperature measuring device at any particular time during processing. However, these automatic controllers have been found to be unsuitable for use in furnaces with temperatures ranging between 1500° C. to 1600° C.

In accordance with the present invention, a pyrometer is made from sintered alumina. This material has been found to be a very good refractory and to have a sufficiently linear expansion which is regular and reversible to permit the use thereof as a pyrometer with a sufficient degree of accuracy.

It is an object of the present invention to provide a high temperature furnace with an automatic controller including a pyrometer tube of sintered alumina which forms the wall of the heating chamber, the expansion of the pyrometer tube being measured by an amplifying device connected to correspondingly control the application of current to the heating chamber.

It is another object of the present invention to provide in an electric furnace a device for measuring the temperature of the heating chamber through an expansion pyrometer which also surrounds and determines the heating chamber of the furnace.

It is a further object of the present invention to provide an automatic controller comprising a device for measuring the actual temperature of the heating chamber and indicating the correspondingly desired theoretical temperature of the heating chamber at any particular time in accordance with a predetermined process, and a controlling device for regulating the application of current to the heating chamber in accordance with variation between desired and actual temperature.

An understanding of the invention may be had from the following description, taken in conjunction with the accompanying drawing, in which:

Figure 1 is an elevation view of the temperature controller constructed in accordance with the invention and used in conjunction with an electric laboratory furnace shown in section.

Figure 2 is an end view of the temperature controller and furnace shown in Figure 1.

Figure 3 is a fragmentary view in section and on an enlarged scale taken along the line 3—3 in Figure 1.

Figure 4 is a fragmentary view on an enlarged scale and showing in the closed position the switch in the circuit which controls the application of current to the heating chamber.

Figure 5 is a schematic view showing more particularly the cooperation of the cam and switch in the position in which they automatically control the cooling of the furnace.

Referring more particularly to Figure 1, there is shown an electric laboratory type furnace F which is capable of developing in the heating chamber a working temperature ranging between 1500° C. and 1600° C. and which is also capable of having its rate of heat development regulated in relation to time according to any predetermined thermal process to be followed. In practice, the variation from the desired temperature at any particular time can be kept within about 1 degree centigrade plus and minus.

The furnace F is well known and the heating chamber is an enclosure which may be circular in section and which is defined within an axial tubular member 2 of sintered alumina surrounded by a heating coil 3 of platinum and rhodium wire which is surrounded by a refractory lining and surrounding layer of heat insulation, all within an outer casing of steel plate.

The ends of the heating coil 3 are connected to contacts 3a, 3b. One of the ends of tube 2 is in constant abutment with a sleeve 4 attached to the outer casing of the furnace, while the other end 2a of the tube projects freely outside of the furnace.

The furnace is carried on a supporting frame, not shown and forming no part of the present invention, but having fixed supports A and B which are also adapted to carry and allow the movement of an expansion measuring device which is made from Invar alloy and as described below.

The expansion measuring device comprises a horizontal cylindrical member 5 carrying a pair of coupling members 6 and abutment members including vertical rods 7 and 8 which are each fastened to one of the clamping members 6 by means of clamping screws 6a which squeeze or bring together the sides of the clamping members, in well known manner.

One of the abutment members consists of the rod 8 which carries a lever 9 pivoting about axis 8a. The upper end of lever 9 is spaced from the rod 8 a distance determined by a micrometer screw which is movable relative to a stationary pointer, also in well known manner. The lower end of the lever 9 is held in abutment against the end 2a of the tube 2 through compression spring 11 which surrounds the cylindrical member 5. The spring 11 is held in compression between support A and an adjustable sleeve 12 which may be fixed along the cylindrical member 5 at any distance from the end of the member.

The other of the abutment members consists of rod 7 which has an extending lug 13 carrying a motion-enlarging lever 15 which is pivotally mounted at pivot 14. The lever 15 is provided below axis 14 with an adjusting screw 16 the tip of which abuts the flat head of a sliding pin 17 moving in guide sleeve 17a which is integral with lug 13. The pin 17 abuts the end of tube 2 through the opening provided in sleeve 4 and exerts a predetermined presure against tube 2 through a weight 15a carried by lever 15.

The rod 7 projects upwardly above clamping member 6 and carries a base 18 which is attached thereto at 7a e. g. by welding. The base 18 rotatably supports a drum 19 which is mechanically driven by a clock mechanism.

The lever 15 projects above pivot 14 and includes a flexible strip 22 which is attached to connecting arm 23 and a support 21 which is attached to lever 15 in any well known manner, for instance through a sleeve, to prevent the flexible strip 21 from bending upward. Another connecting arm 24 is attached to stem 23 in any well known manner, for instance through a sleeve 27 of electrically non-conducting material. The sleeve 27 carries another flexible strip 25 through a further sleeve 28 similar to sleeve 27 and also of electrically non-conducting material. The end of the connecting arm 24, Figure 4, carries an angle element 29 of electrically conducting material and a support 30 of electrically non-conducting material. The flexible strip 25 is provided with a platinum contact 31 adjacent the end thereof and with a follower 32. The angle element 29 allows downward bending movement of flexible strip 25.

The movement of the expansion measuring device along the axis of cylindrical member 5 is facilitated by roller bearings 33a, 33b, 33c carried by the fixed support A and which are angularly spaced by 120° about the circumference of the cylindrical member 5, and by roller bearings 34, 34a which are carried by the fixed support B.

Fixed support B also carries a vertical pin 35 at the upper end of which a roller bearing assembly 36 is rotatably secured within the forked extremity 36a of base 18. This assembly prevents rotation of the expansion measuring device about the axis of horizontal cylindrical member 5.

Figure 1 shows the electrical connection of the furnace F to the power circuit R. The control circuit is supplied by voltage of the order of 8 volts from a battery, S. The mercury switch 37, well known, is pivoted about pivot 37a by electromagnet 40 which is exposed to the flux in the solenoid 39 in the control circuit and which acts in opposition to the weight 38, the movement of the mercury switch 37 in dependence upon flux developed in the solenoid 39 of the control circuit regulates the application of current through the power circuit R and correspondingly the heat developed in the heating chamber.

Referring again to the control circuit the leads from battery S extends up to contacts 43a, 43b, respectively carried on an electrically non-conducting support mounted on rod 7 thence through flexible leads to the connecting arm 24 and to flexible strip 25 respectively. The flexible strip 25 is shown in Figure 1 in its rest position when contact 31 is in abutment with angle element 29 so that the control circuit is closed.

When the control circuit is closed, the solenoid 39 is energized and the electromagnet 40 is energized to lift the weight 38 so that the mercury switch 37 closes the circuit of the current for heating the furnace. However, as soon as the current passes through the heating coil 3, expansion pyrometer tube 2 expands and its expansion is operative to move lever 9 thereby shifting the expansion measuring device including the cylindrical member 5 toward the left through rod 8 against spring 11 thereby also shifting the rod 7 and lug 13 relative to pin 17. Since the pin 17 abuts the other end of tube 2 and it is abutted by the end of screw 16 attached to lever 15, the lever 15 will be pivoted counterclockwise about pivot 14 upon shifting of lug 13 and rod 7. Therefore, the follower 32 which may abut the template 41 moves to the left in the manner described below.

Since the template 41 which is carried by the drum 19 rotates with the latter in the direction of the arrow f, see Figure 4, it is understood that if the movement of the follower 32 is suitable; that is, provided the rate of heating of the furnace during the time interval follows the predetermined conditions, the movement of the follower 32 will not be restrained by engagement with the template 41.

If on the other hand the heating chamber of the furnace becomes overheated or becomes too quickly heated, the movement of the follower 32 will be too rapid relatively to the withdrawal of the template 41 which is mounted on the mechanically driven drum 19. The curve of the template 41, as predetermined, will then block the movement of the follower 32 and bend the flexible strip 25 to thereby separate contacts 29 and 31 opening the control circuit of the furnace which deenergizes solenoid 39 so that weight 38 is then operative to tip the mercury switch 37 and thereby open the power circuit. Thus, the increase in temperature of the heating chamber of the furnace will be interrupted until the movement of the template 41 frees the follower 32 for further movement. At such time, the flexible strip 25 returns to its normal position to close the circuit through engagement between contacts 29 and 31, and the solenoid 39 is reenergized to close the power circuit of the furnace and so forth.

Thus, an increase in temperature of the heating chamber of the furnace which is a function of the time is controlled in accordance with a predetermined relationship owing to the shape of the curve of the template 41, so long as this relationship is limited to an increase in temperature which must always be less than that increase in temperature which would occur if the power circuit for heating the furnace were continuously closed.

Since the thermal expansion or contraction of the expansion pyrometer tube 2 in relation to temperature may be measured and calibrated, it is relatively simple to prepare a template for each particular process of heating which the furnace must follow. The drum 19 is preferably covered with a removable sheet of cardboard provided with coordinates and having a temperature scale along the abscissa and a time scale along the ordinate around the circumference of the drum. A cardboard strip 42 is attached by glue or the like attaching means to the surface of each of the sheets of cardboard and the template which is also of cardboard, electrically non-conductive, is attached by glue or the like attaching means to the cardboard strip 42. Thus the cam surface of the template extends over the edges of the strip 42 and projects above the surface of the drum 19.

Figure 5 is a schematic view of the development of the template for a particular thermal process in which the lines 41 and 41a correspond respectively to the rate of increase of the temperature in the heating chamber and to the maintainance of a predetermined heating chamber temperature. The line 41b corresponds to the rate of cooling of the heating chamber of the furnace in accordance with the particular process to be followed.

Referring to line 41b the template rotates with the drum in the direction of arrow f and therefore tends to push follower 32 (which is also provided with a roller) toward the right to thereby separate contacts 29 and 31 and open the control circuit which results in the opening of power circuit R to thereby allow cooling of the heating chamber.

If, and as is usually the case, the rate of cooling of the heating chamber is slower than its normal rate of cooling, the control device including the contacts 29 and 31 and the electrical control circuit for the power circuit will be effective to control the current to the heating chamber. This control will occur through additional heating of the heating chamber upon the closing of the contacts 29 and 31 when the cooling is too rapid. Thus, follower 32 of lever 15 pivots to the right in Figure 5 in response to contraction of the sintered alumina tube 2 and becomes disengaged from contact with line 41b of template. Therefore, the lowering of the heating chamber temperature will follow successive steps or stages in accordance with the rate of cooling which is determined by the line 41b of the template.

If on the other hand the desired rate of cooling of the heating chamber were to exceed the rate of normal cooling, then the follower 32 would be in abutment with template 41b and rolling thereagainst and forced against the electrically non-conducting stop member 30 by the bending of the flexible strip 22 thereby carrying the lever 15 and associated parts to the right to prevent damaging of the automatic controller or rendering same inaccurate.

The instrument is operated for each process by bringing the follower 32 very close to template 41 and adjacent the normal or room temperature found on scale G of the removable sheet of cardboard on drum 19 to which template 41 is attached.

The micrometer screw 10 allows regulation of the initial or starting position of the follower 32 and to make any adjustment in temperature measurement which may be necessary.

It is preferred for relative accuracy of the automatic controller to make the cylindrical element 5, rods 7 and 8, lever 9, micrometer screw 10, lug 13 and sliding pin 17 of Invar alloy or other suitable material with an exceedingly low coefficient of linear expansion.

Having thus described the invention, it can be seen that the automatic controller comprises a temperature measuring assembly including an expansion pyrometer 2 of sintered alumina defining the wall of the heating chamber, a mechanically driven indicator 19 etc., provided with a predetermined temperature time graphical representation of a particular process to be followed in the heating chamber, an expansion measuring device 5, 7, 8, 9, 13, 15, 16 etc., between indicator 19 and the expansion pyrometer tube 2 for transmitting the actual expansion of the expansion pyrometer which is a function of the actual temperature in the heating chamber and indicating same on the indicator 19 thereby reflecting the differential between actual and theoretical or predetermined temperature on the indicator, and a control assembly including a pair of contacts 29 and 31 in an electrical circuit which control the current supply to the heating chamber, the pair of contacts being operative in correspondence with coincidence of the actual temperature with the theoretical or predetermined temperature of the heating chamber and so that upon any departure from such coincidence the current to the heating chamber is correspondingly regulated to bring the actual temperature back into coincidence with the predetermined temperature.

Having thus described the invention, it will be understood that the same is capable of modifications well within the scope of anyone skilled in the art and that the invention is defined in the appended claims and is to be considered to be comprehensive of all the forms of structure coming within their scope.

What is claimed is:

1. Apparatus for use with a temperature control mechanism and with an expansible externally insulated furnace mounted on a stationary supporting frame and expansible in proportion to temperature in the heating chamber, which includes an expansion measuring device carried by said frame outside of said furnace and comprising: a cylindrical member of material having a low coefficient of expansion and carried by said frame for sliding movement relative thereto and spaced from said furnace, said cylindrical member being provided with abutment members depending therefrom and continuously engaging opposite ends of said furnace to locate said cylindrical member on said frame whereby said expansion measuring device straddles said furnace, one of said abutment members being provided with a sliding connection relative to said cylindrical member so that said one abutment member slides first in one direction and then in the opposite direction respectively in response to expansion and contraction of said furnace; said control mechanism being operatively connected to said one abutment member for regulating temperature in said furnace as a function of the movement of said one abutment member.

2. Apparatus constructed in accordance with claim 1 in which said frame is provided with roller bearings in engagement with said cylindrical member to permit free movement of the latter relative to said frame.

3. Apparatus constructed in accordance with claim 1 in which said expansion measuring device includes a sleeve fixed to said cylindrical member and a spring member surrounding said cylindrical member and extending between said frame and said sleeve so that the other of said abutment members is urged by said spring member into abutment with one of the ends of said furnace.

4. Apparatus constructed in accordance with claim 1 in which the other of said abutment members comprises a vertical rod secured to said cylindrical member, a lever pivotally carried by said vertical rod, and a micrometer screw carried by said lever and abutting said vertical rod to adjust the angular position of said lever so that the end of the latter abuts the adjacent end of said furnace.

5. Apparatus constructed in accordance with claim 1 in which said one abutment member comprises a vertical rod secured to said cylindrical member, a counterbalanced weighted motion-enlarging lever pivotally carried by said vertical rod and having an adjusting screw, a pin sliding in an opening provided in said vertical rod, said lever pressing said screw itno abutment with said pin to engage the latter against the adjacent end of said furnace.

6. A temperature control apparatus comprising an expansible externally insulated furnace mounted on a stationary supporting frame and expansible in proportion to temperature in the heating chamber to act as a temperature measurement instrument, a heating chamber temperature regulating mechanism, and an expansion measuring device carried by said frame outside of said furnace and which comprises: a cylindrical member of material having a low coefficient of expansion and carried by said frame for free sliding movement relative thereto and spaced from said furnace, said cylindrical member being provided with abutment members depending therefrom and continuously engaging opposite ends of said furnace to locate said cylindrical member on said frame whereby said expansion measuring device straddles said furnace, one of said abutment members being provided with a sliding connection relative to said cylindrical member so that said one abutment member slides first in one direction and then in the opposite direction in response to expansion and contraction of said furnace; said temperature regulating mechanism being operatively connected to said one abutment member for regulating temperature in the heating chamber of said furnace as a function of the movement of said one abutment member.

7. The temperature control apparatus constructed in accordance with claim 6 in which said frame is provided with roller bearings in engagement with said cylindrical member to permit free movement of the latter relative to said frame.

8. The temperature control apparatus constructed in accordance with claim 6 in which said expansion measuring device includes a sleeve fixed to said cylindrical member and a spring member surrounding said cylindrical member and extending between said frame and said sleeve so that the other of said abutment members is urged by said spring member into abutment with one of the ends of said furnace.

9. The temperature control apparatus constructed in accordance with claim 6 in which the other of said abutment members comprises a vertical rod secured to said cylindrical member, a lever pivotally carried by said vertical rod, and a micrometer screw carried by said lever and abutting said vertical rod to adjust the angular position of said lever so that the end of the latter abuts the adjacent end of said furnace.

10. The temperature control apparatus constructed in accordance with claim 6 in which said one abutment member comprises a vertical rod secured to said cylindrical member, a counterbalanced weighted motion-enlarging lever pivotally carried by said vertical rod and having an adjusting screw, and a pin sliding in an opening provided in said vertical rod, said lever pressing said screw into abutment with said pin to engage the latter against the adjacent end of said furnace.

References Cited in the file of this patent

UNITED STATES PATENTS

| | | |
|---|---|---|
| 1,158,972 | Boeck | Nov. 2, 1915 |
| 1,320,580 | Somerville | Nov. 4, 1919 |
| 2,151,319 | Finch | Mar. 21, 1939 |
| 2,563,304 | Bjork | Aug. 7, 1951 |